United States Patent
Abe et al.

(10) Patent No.: US 9,969,452 B2
(45) Date of Patent: May 15, 2018

(54) INFORMATION COLLECTION SYSTEM, INFORMATION PROCESSING SYSTEM, INFORMATION DISPLAY DEVICE, AND NON-TRANSITORY, TANGIBLE COMPUTER-READABLE MEDIUM

(71) Applicant: Shimano Inc., Sakai, Osaka (JP)

(72) Inventors: Ryuji Abe, Osaka (JP); Tim Gerrits, CT Nunspeet (NL)

(73) Assignee: Shimano Inc., Osaka (JP)

( * ) Notice: Subject to any disclaimer, the term of this patent is extended or adjusted under 35 U.S.C. 154(b) by 678 days.

(21) Appl. No.: 14/553,091

(22) Filed: Nov. 25, 2014

(65) Prior Publication Data

US 2015/0198442 A1   Jul. 16, 2015

(30) Foreign Application Priority Data

Jan. 10, 2014   (JP) ................. 2014-003168

(51) Int. Cl.
| H03F 1/26 | (2006.01) |
|---|---|
| H04B 15/00 | (2006.01) |
| B62J 99/00 | (2009.01) |
| B62M 25/00 | (2006.01) |

(52) U.S. Cl.
CPC ........ B62J 99/00 (2013.01); *B62J 2099/0026* (2013.01); *B62M 2025/003* (2013.01)

(58) Field of Classification Search
CPC .. F16H 15/503; F16H 15/28; F16H 2037/026; F16H 2037/088; F16H 2037/0893; F16H 2200/2005; F16H 2200/2007; F16H 37/022; F16H 37/086; F16H 1/28; F16H 2059/666; F16H 2063/3093; F16H 59/44; G06F 21/602; G06F 21/6227; G06F 21/6245; G06F 2221/2111; G06F 2221/2151; G06F 17/30241; G06F 17/30368; G06F 17/30887; G06F 19/00; G06F 19/328; G06F 19/3418; G06F 19/3456; G06F 21/31
See application file for complete search history.

(56) References Cited

U.S. PATENT DOCUMENTS

| 6,834,876 | B2 | 12/2004 | Fukuda | |
|---|---|---|---|---|
| 7,089,100 | B2 | 8/2006 | Takeda et al. | |
| 2004/0176895 | A1* | 9/2004 | Takeda | ............... B62M 25/08 701/51 |

FOREIGN PATENT DOCUMENTS

| CN | 102464085 A | 5/2012 |
|---|---|---|
| DE | 19619899 A1 | 11/1997 |
| DE | 69708537 T2 | 7/2002 |
| TW | 200303401 A | 9/2003 |
| TW | 200418672 A | 10/2004 |

(Continued)

*Primary Examiner* — Roy Y Yi
(74) *Attorney, Agent, or Firm* — Global IP Counselors, LLP

(57) ABSTRACT

An information collection system is configured to collect information related to a bicycle. The information collection system is basically provided with a shift position information acquisition unit and a first controller. The shift position information acquisition unit is configured to acquire shift position information related to a bicycle transmission apparatus having a plurality of shift positions. The first controller is programmed to transmit the shift position information acquired during a certain period.

17 Claims, 13 Drawing Sheets

(56) References Cited

FOREIGN PATENT DOCUMENTS

TW         201247480 A    12/2012
TW         201339018 A    10/2013

* cited by examiner

| ADDRESS | RECORDED TIME | SHIFT POSITION | TRAVEL INFORMATION ||
|---------|---------------|----------------|---------|----------|
|         |               |                | CADENCE | VELOCITY |
| XXXXXX  | XX:XX:XX      | T5             | 80 rpm  | 45 km/hr |
| XXXXXX  | XX:XX:XX      | T4             | 82 rpm  | 44 km/hr |
| XXXXXX  | XX:XX:XX      | T6             | 80 rpm  | 40 km/hr |
| XXXXXX  | XX:XX:XX      | T8             | 85 rpm  | 42 km/hr |
| XXXXXX  | XX:XX:XX      | L6             | 87 rpm  | 36 km/hr |
| XXXXXX  | XX:XX:XX      | L8             | 89 rpm  | 34 km/hr |

FIG. 2

| FRONT SPROCKET TOOTH NUMBER | | REAR SPROCKET TOOTH NUMBER | | | | | | | | | |
|---|---|---|---|---|---|---|---|---|---|---|---|
| | | 1ST | 2ND | 3RD | 4TH | 5TH | 6TH | 7TH | 8TH | 9TH | 10TH |
| | | 12 | 13 | 14 | 15 | 16 | 17 | 19 | 21 | 23 | 25 |
| L | 42 | 3.5 | 3.23 | 3.0 | 2.8 | 2.63 | 2.47 | 2.21 | 2.0 | 1.83 | 1.68 |
| T | 55 | 4.58 | 4.23 | 3.93 | 3.67 | 3.44 | 3.24 | 2.89 | 2.62 | 2.39 | 2.2 |

FIG. 3

INFORMATION COLLECTION SYSTEM, INFORMATION PROCESSING SYSTEM, INFORMATION DISPLAY DEVICE, AND NON-TRANSITORY, TANGIBLE COMPUTER-READABLE MEDIUM

CROSS-REFERENCE TO RELATED APPLICATIONS

This application claims priority under 35 U.S.C. § 119 to Japanese Patent Application No. 2014-003168, filed Jan. 10, 2014. The entire disclosure of Japanese Patent Application No. 2014-003168 is hereby incorporated herein by reference.

BACKGROUND

Field of the Invention

This invention generally relates to an information collection system and a bicycle information display device. More specifically, the present invention relates to an information collection system configured to collect information related to a bicycle, and a bicycle information display device for displaying collected information.

Background Information

There is a demand of late to enable a user (rider) of a bicycle to know how a shift position of a transmission apparatus has changed according to how the transmission apparatus was operated, so that training of the user can be accomplished efficiently. In a conventional bicycle, although the user can know a current shift position from a display device called a "cycle computer," the user could not know what kinds of shift positions were used during travelling.

SUMMARY

Generally, the present disclosure is directed to various features of an information collection system and a bicycle information display device. An object of the present invention is to provide an information collection system and/or a bicycle information display device that enable a user to know what kinds of shift positions were used.

In view of the state of the known technology, an information collection system is provided that is configured to collect information related to a bicycle. The information collection system comprises a shift position information acquisition unit and a first controller. The shift position information acquisition unit is configured to acquire shift position information related to a bicycle transmission apparatus having a plurality of shift positions. The first controller is programmed to transmit the shift position information acquired during a certain period.

In this information collection system, the first controller transmits the shift position information acquired in a certain period when the shift position information acquisition unit acquires the shift position information. This transmitted shift position information is analyzed (for example, use frequencies of a plurality of shift positions are calculated), whereby the user can know what kinds of shift positions were used.

A memory device can be further provided in communication with the first controller, and the first controller can store the shift position information in the first memory device. In this case, a change of shift positions over a time series can be known by reading the shift position information stored in the memory device.

The first controller can be programmed to calculate a use frequency of each shift position of the bicycle transmission apparatus based on the shift position information stored in the memory device. In this case, the use frequency of each shift position is calculated, and therefore a shifting trend of the user can be known.

A first display unit can be further provided in communication with the first controller, and the first controller can be programmed to control the first display unit to display the use frequency. In this case, the use frequency of each shift position can be known visually.

An information output unit can be further provided that is configured to externally output information stored in the memory device with respect to the information collection system. In this case, the shift position information accumulated in the memory device can be analyzed by an external device, and therefore various kinds of analysis related to the shift position information can be performed by the external device.

The information output unit can be configured to externally output the shift position information in a wired or wireless manner. In this case, the shift position information can be externally output in a wired or wireless manner.

The transmission apparatus can include an external transmission and/or an internal transmission, and the shift position information can include a shift position of the external transmission and/or a shift position of the internal transmission. In this case, changes of shift positions of the external transmission and the internal transmission can be known.

The transmission apparatus can include a front derailleur and/or a rear derailleur, and the shift position information can include a shift position of the front derailleur and/or a shift position of the rear derailleur. In this case, a change of shift positions of at least one of the front derailleur and the rear derailleur can be known.

The transmission apparatus can include both a front derailleur and a rear derailleur, and the shift position information can include information related to a combination of a shift position of the front derailleur and a shift position of the rear derailleur. In this case, a change of a combination of shift positions of the front derailleur and the rear derailleur can be known. It can thereby be determined as to whether an invalid combination of shift positions not normally was or was not used.

A travel information acquisition unit configured to acquire travel information of the bicycle can be further provided, and the first controller can be programmed to transmit the acquired travel information in association with the shift position information. In this case, the relationship between the travel information and the shift position can be known because the travel information is transmitted in association with the shift position information.

The travel information can include at least one of wheel rotation speed, velocity, cadence, inclination, ambient temperature, ambient humidity, altitude, acceleration, foot power, and user heart rate. In this case, the relationship between the travel information and the shift position, which has an influence on physical strength of the user, can be known.

The information processing system according to another aspect of the present invention includes an information collection device configured to collect information related to a bicycle and an information processing device capable of communicating with the information collection device. The information collection device comprises a shift position information acquisition unit configured to acquire shift position information related to a transmission apparatus having a plurality of shift positions, and an information output unit configured to externally output the shift position information acquired by the shift position information acquisition unit. The information processing device comprises a second controller programmed to calculate a use frequency of each shift position of the transmission apparatus based on the shift position information output from the information output unit. In this information processing system, the use frequency of each shift position is calculated by the information processing device based on the shift position information collected and output by the information collection device. Here, a large volume of shift position information can be handled because the use frequency is calculated by the information collection device mounted on the bicycle and the second controller in a separate information processing device.

The information processing device can further comprise a second display unit, and the second controller can be programmed to control the second display unit to display the use frequency. In this case, the use frequency calculated by the second controller is displayed by the external second display unit.

The information collection device can further comprise a travel information acquisition unit configured to acquire travel information of the bicycle, the information output unit may be configured to output the travel information associated with the shift position information, and the second controller can be programmed to control the second display unit to display at least one of the use frequency and the travel information. In this case, at least one of the travel information associated with the shift position information and the shift position information is processed by the information processing device and is displayed on the second display unit, and therefore a large amount of shift position information can be processed, and the user can know with more accuracy what kinds of shift positions were used in combination with the travel information.

The second controller can be programmed to control the second display unit to display three-dimensionally at least one of the use frequency and the travel information. In this case, a plurality of items of travel information can be displayed for each item of shift position information because the information is displayed three-dimensionally.

The information display device according to yet another aspect of the present invention comprises a third display unit and a third controller. The third controller can be programmed to calculate a use frequency of each shift position of a bicycle transmission apparatus having a plurality of shift positions, based on shift position information related to the transmission apparatus acquired during a certain period by a shift position information acquisition unit for acquiring the shift position information, and controls the third display unit to display the use frequency.

In this information display device, the use frequency of each shift frequency is calculated based on the shift position information acquired during a certain period by the shift position information acquisition unit, and the calculated use frequency is displayed on the third display unit. The user can know what kinds of shift positions were used in accordance with the displayed use frequency.

In accordance with yet another aspect of the present invention, a non-transitory, tangible computer-readable medium can be provided that is encoded with a computer program programmed to use stored data of an information collection system that collects information related to a bicycle. The computer program executes includes an instruction to acquire shift position information related to a bicycle transmission apparatus having a plurality of shift positions, and an instruction to transmit the shift position information acquired during a certain period.

When this computer program is executed, the shift position information is acquired and the shift position information acquired during a certain period is transmitted. This transmitted shift position information during a certain period is analyzed (for example, use frequencies of a plurality of shift positions are calculated), whereby the user can know what kinds of shift positions were used.

According to the present invention, shift position information is analyzed, whereby a user can know what kinds of shift positions were used.

Also other objects, features, aspects and advantages will become apparent to those skilled in the bicycle field from the following detailed description, which, taken in conjunction with the annexed drawings, discloses illustrative embodiments.

BRIEF DESCRIPTION OF THE DRAWINGS

Referring now to the attached drawings which form a part of this original disclosure:

FIG. 2 is a flowchart illustrating one example of control operation executed by a first controller including a computer program encoded on a non-transitory, tangible computer-readable medium according to one embodiment;

FIG. 3 is a flowchart illustrating one example of control operation of information collection processing executed by the first controller;

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
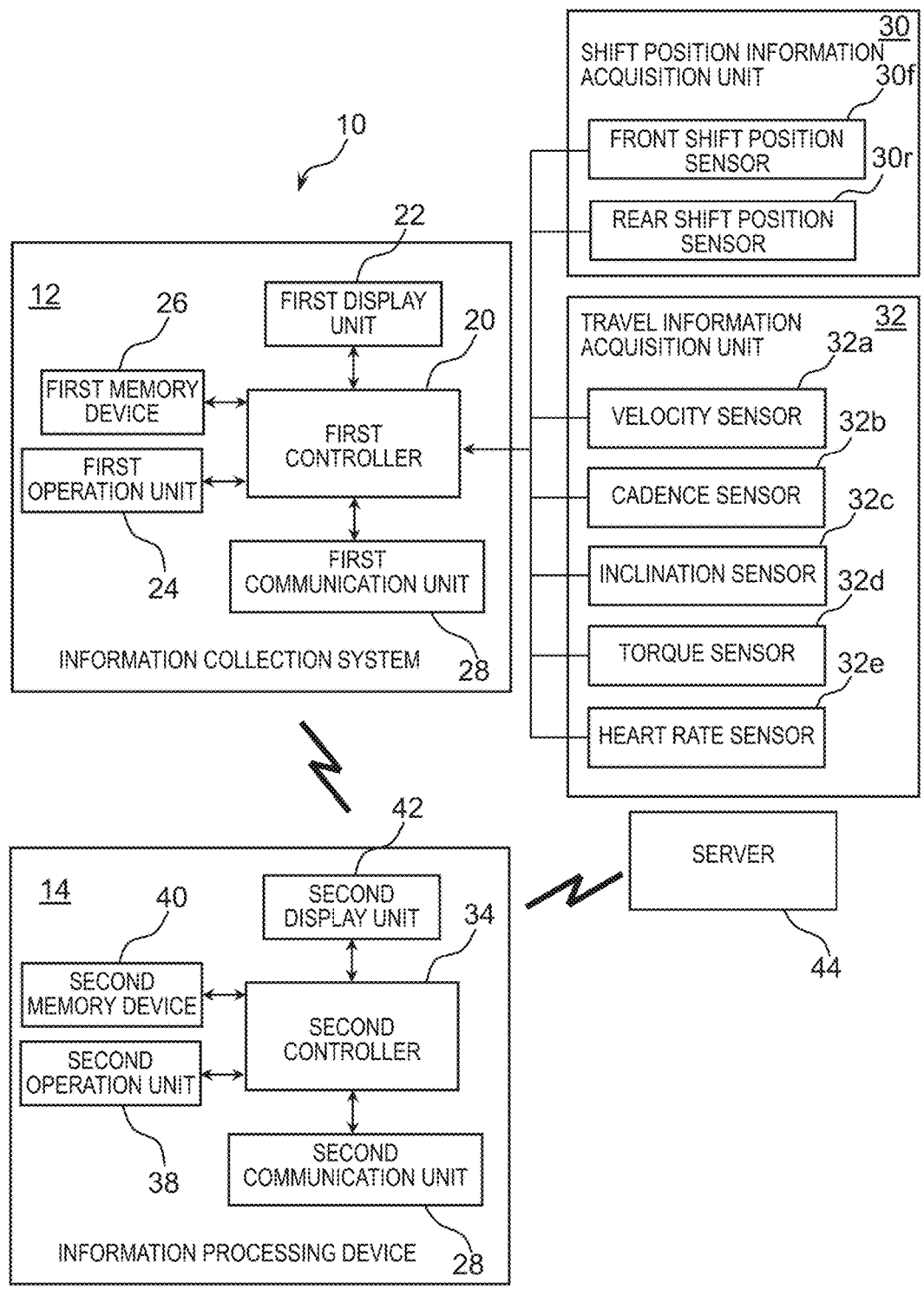
FIG. 1 is a block diagram illustrating a configuration of an information collection system, an information collection device, and an information processing system according to one embodiment.

Referring initially to FIG. 1, an information processing system 10 is illustrated in accordance with a first embodiment. In FIG. 1, the information processing system 10 has an information collection system 12 and an information processing device 14. The information collection system 12 is one example of an information collection device and an information display device. The information collection system 12 is configured to collect shift position information of a bicycle having a plurality of shift positions. The information collection system 12 may be a so-called "cycle computer," being a system that is capable of displaying vehicle speed, cadence, travel distance, and the like. The information collection system 12 has a first controller 20 that is configured, for example, by a microcomputer.

A first display unit 22, a first operation unit 24, a first memory device 26, a first communication unit 28, a shift position information acquisition unit 30, and a travel information acquisition unit 32 are connected to the first controller 20. The first controller 20 transmits the shift position information acquired during a certain period to the memory device 26. The first controller 20 controls the first display unit 22, the first memory device 26 and the first communication unit 28 in accordance with operation of the first operation unit 24 and information acquired by the shift position information acquisition unit 30 and the travel information acquisition unit 32. Specifically, the first controller 20 transmits the shift position information and the travel information to the first memory device 26, and controls the first memory device 26 to record the shift position information and the travel information. At this time, the first controller 20 acquires the shift position information and the travel information in a prescribed cycle from the shift position information acquisition unit 30 and the travel information acquisition unit 32. The first controller 20 can transmit at one time to the first memory device 26 a plurality of items of shift position information and travel information buffered in a cache memory not illustrated of the first controller 20, and can transmit the shift position information and the travel information to the first memory device 26 each time the information is acquired. The first controller 20 outputs the shift position information, and the like, stored in the first memory device 26 to the information processing device 14 by way of the first communication unit 28 when there is a request for output of the shift position information, and the like, stored in the first memory device 26 from the information processing device 14.

The first display unit 22 is, for example, a liquid crystal display that displays information acquired by the shift position information acquisition unit 30 and the travel information acquisition unit 32. The first operation unit 24 has at least one operation switch or a touch panel. In the present embodiment, the first operation unit 24 is provided with a plurality of operation switches. The first memory device 26 is one example of the memory device. For example, an EEPROM (Electrically Erasable Programmable Read-Only Memory), flash memory, or other rewritable nonvolatile memory can be used for the first memory device 26. In the present embodiment, an EEPROM is used. A recorded time, shift position information, and travel information are each stored in an address in the first memory device 26 as illustrated in FIG. 2. Accordingly, the shift position information and the travel information are stored in a time series. The acquisition times of the shift position information and the travel information are stored in the recorded time field in a format of date and hours, minutes and seconds. Combined information of a front shift position FGP and a rear shift position RGP is stored in the shift position information field. For example, at least velocity detected by a velocity sensor 32a and cadence detected by and a cadence sensor 32b to be described are stored in the travel information field.

The first communication unit 28 is one example of the information output unit as illustrated in FIG. 1. The first communication unit 28 is configured to communicate with the information processing device 14. Any of ISO/IEC 18092 or other NFC (Near Field Communication) standard, IEEE 802.11 or other wireless LAN (Local Area Network) standard, and IEEE 802.15.1 or other Bluetooth®, or other short-range wireless communication standard can be used for the first communication unit 28. In the present embodiment, Bluetooth® is used. A USB (Universal Serial Bus) or another cable standard can also be used for the first communication unit 28.

The shift position information acquisition unit 30 is configured to acquire shift position information related to a bicycle transmission apparatus having a plurality of shift positions. The shift position information acquisition unit 30 includes a front shift position sensor 30f configured to detect a shift position of a front derailleur as an external transmission apparatus not illustrated, and a rear shift position sensor 30r configured to detect a shift position of a rear derailleur as an external transmission apparatus not illustrated. In the present embodiment, combined information of the shift positions of the front shift position sensor 30f and the rear shift position sensor 30r is used as the shift position information. In the present embodiment, the front derailleur has, for example, two shift positions of "1" and "2." The rear derailleur also has, for example, ten shift positions from "1" to "10." Each shift position corresponds to one or a plurality of front sprockets not illustrated and one or a plurality of rear sprockets not illustrated installed on the bicycle. Specifically, the shift position corresponding with the front/rear sprocket in a position most near the bicycle main body is "1," and the number representing the shift position henceforth becomes larger while going away from the bicycle main body. In the following description, a shift position combining the front sprocket and the rear sprocket is denoted with the first position of the front sprocket as "L" and the second position of the front sprocket as "T." The rear sprockets are denoted by the value of the respective position number. Accordingly, the case when the front sprocket is in the first position and the rear sprocket is in the sixth position is denoted as "L6."

As illustrated in FIG. 3, the number of front sprockets for the front derailleur to hang the chain is two. The tooth number of the L front sprocket is, for example, "42." The tooth number of the T front sprocket is, for example, "55." The number of rear sprockets for the rear derailleur to hang the chain is, for example, 10. The tooth numbers of the rear sprockets are, for example, "12" for the first position, "13" for the second position, "14" for the third position, "15" for the fourth position, "16" for the fifth position, "17" for the sixth position, "19" for the seventh position, "21" for the eighth position, "23" for the ninth position, and "25" for the tenth position. Accordingly, there are in total twenty combinations of front sprockets and rear sprockets. Combinations in which the shift ratios are closely similar and the arrow does not pass through are not recommended, but are used in accordance with user preference. Use of the combination (T10) with the first sprocket in the first position and the rear sprocket in the tenth position, and the combination (L1) with the front sprocket in the second position and the rear sprocket in the tenth position, both where the chain runs diagonally to the extreme and both being indicated by hatching, is normally inaccessible. However, combinations not recommended or inaccessible combinations are stored in the first memory device 26. The user can thereby confirm the error of shift operation.

The shift position of an internal transmission apparatus may be used when the bicycle has an internal transmission apparatus. Combined information of a front shift position sensor and the shift position of the internal transmission apparatus may be used when the bicycle has both a front derailleur and an internal transmission apparatus.

As illustrated in FIG. 1, the travel information acquisition unit 32 has a velocity sensor 32a, a cadence sensor 32b, an inclination sensor 32c, a torque sensor 32d and a heart rate sensor 32e. The velocity sensor 32a is provided, for example, on the front fork so as to be able to detect a detection element (for example, a magnet) provided on the front wheel of the bicycle. The cadence sensor 32b is provided, for example, on a hanger part so as to be able to detect a detection element (for example, magnets arranged at with spacing in the circumferential direction) provided on the crank arm of the bicycle. The inclination sensor 32c includes, for example, a semiconductor gyro provided on the frame of the bicycle. The torque sensor 32d includes a magnetostrictive element provided on the crank shaft of the bicycle and a coil provided in the frame in the periphery of the crank shaft. The heart rate sensor 32e includes an off-the-shelf cardiometer fixed to the user's body. These can be optionally selected by the user in accordance with the operation of the first operation unit 24. In the present embodiment, the case when velocity and cadence are selected is illustrated as travel information. The heart rate sensor 32e may be connected by wireless to the information collection system 12.

The information processing device 14 is realized, for example, by a personal computer, smartphone, tablet, or other information processing terminal. The information processing device 14 has a second controller configured by a microcomputer 34. A second display unit 36, second operation unit 38, second memory device 40, and second communication unit 42 are connected to the second controller 34. The second controller 34 controls the second display unit 36, second memory device 40, and second communication unit 42 in accordance with operation of the second operation unit 38 and information transmitted from the information collection system 12. The control operation performed by the second controller 34 is realized by software including an application (App) and a computer program. A non-transitory, tangible computer-readable medium is encoded with the computer program, which is programmed to use stored data of the information collection system 12 as discussed above.

The second display unit 36 is, for example, a liquid crystal display, and information processed by the second controller 34 is displayed. The second operation 38 unit includes a mouse and keyboard or a touch panel. For example, a flash memory or other rewritable nonvolatile memory or a hard disk is adopted for the second memory device 40. In the present embodiment, a flash memory is adopted.

The second communication unit 42 is configured to communicate with the information collection system 12 and a server 44. IEEE 802.11 or other wireless LAN (Local Area Network) standard and IEEE 802.15.1 or other Bluetooth® or other short-range wireless communication standard is adopted for the second communication unit 42. In the present embodiment, the second communication unit 42 communicates with the information collection system 12 by Bluetooth® and communicates with the server 44 by wireless LAN. In the server 44, shift position information and travel information are stored for each item of identifying information. USB (Universal Serial Bus) or another cable communication standard also may be adopted for the second communication unit 42. The first communication unit 28 may communicate with the server 44.

Figure 4:
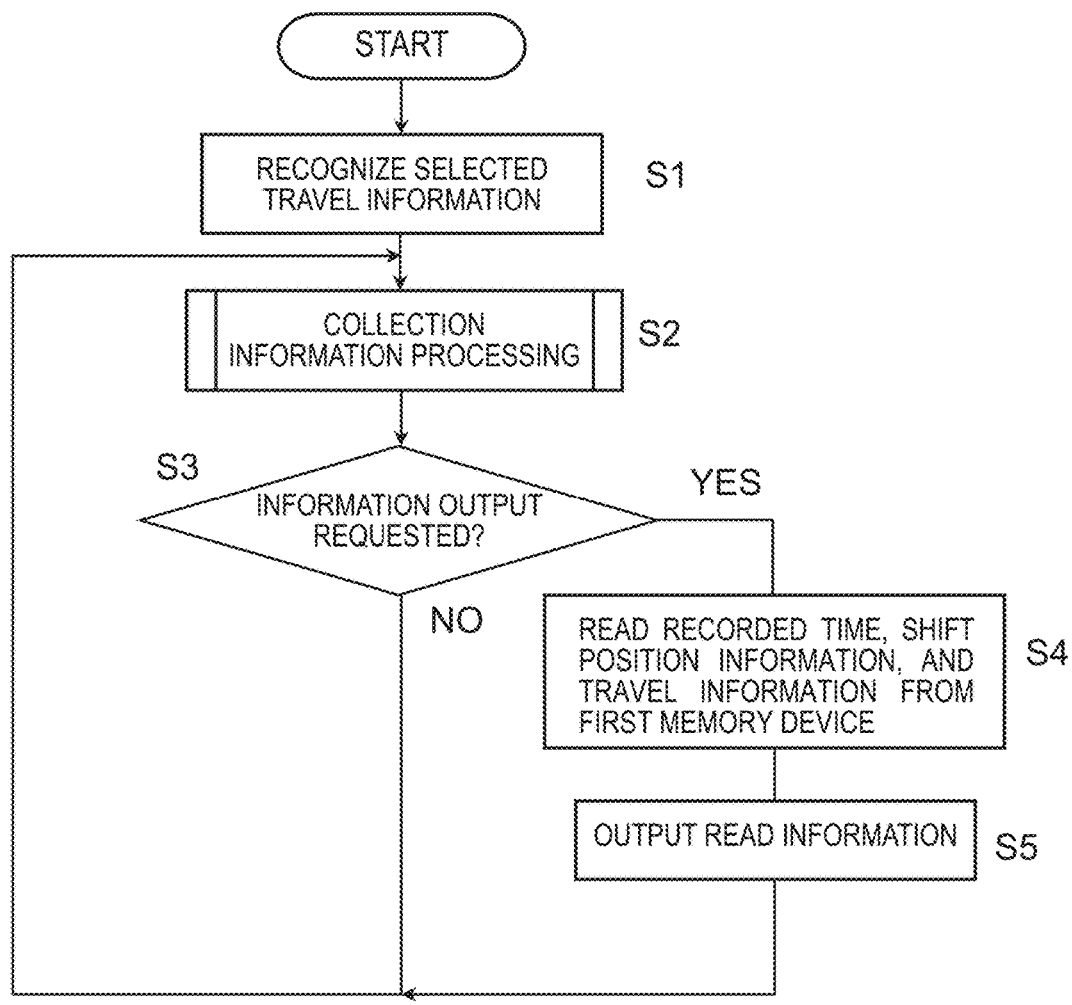
FIG. 4 is a table illustrating one example of content stored in the first memory device.

The control operation of the first controller 20 of the information collection system 12 is next described based on the flowchart illustrated in FIG. 4.

In step S1 in FIG. 4, the first controller 20 recognizes travel information selected by the user in accordance with operation of the first operation unit 24. The user uses the first operation unit 24 to select a plurality of items of travel information to be displayed from a plurality of items of travel information displayed on the first display unit 2. In the travel information selection processing, although all of the travel information can be selected, normally two to four items of travel information is selected. When travel information selected by the user is recognized, the process proceeds to step S2. In step S2, the first controller 20 executes the information collection processing illustrated in FIG. 5. In step S3, the first controller 20 determines whether the information processing device 14 has or has not requested to output information stored in the first memory device 24. When the first controller 20 determines that the information processing device 14 has not requested to output information, the process returns to step S2. When the first controller 20 determines that the information processing device 14 has requested to output information, the process proceeds from step S3 to step S4. In step S4, the recorded time, the shift position information, and the travel information stored in the first memory device 24 is read. In step S5, the read information is output to the information processing device by way of the first communication unit 28, and the process returns to step S2.

Figure 5:
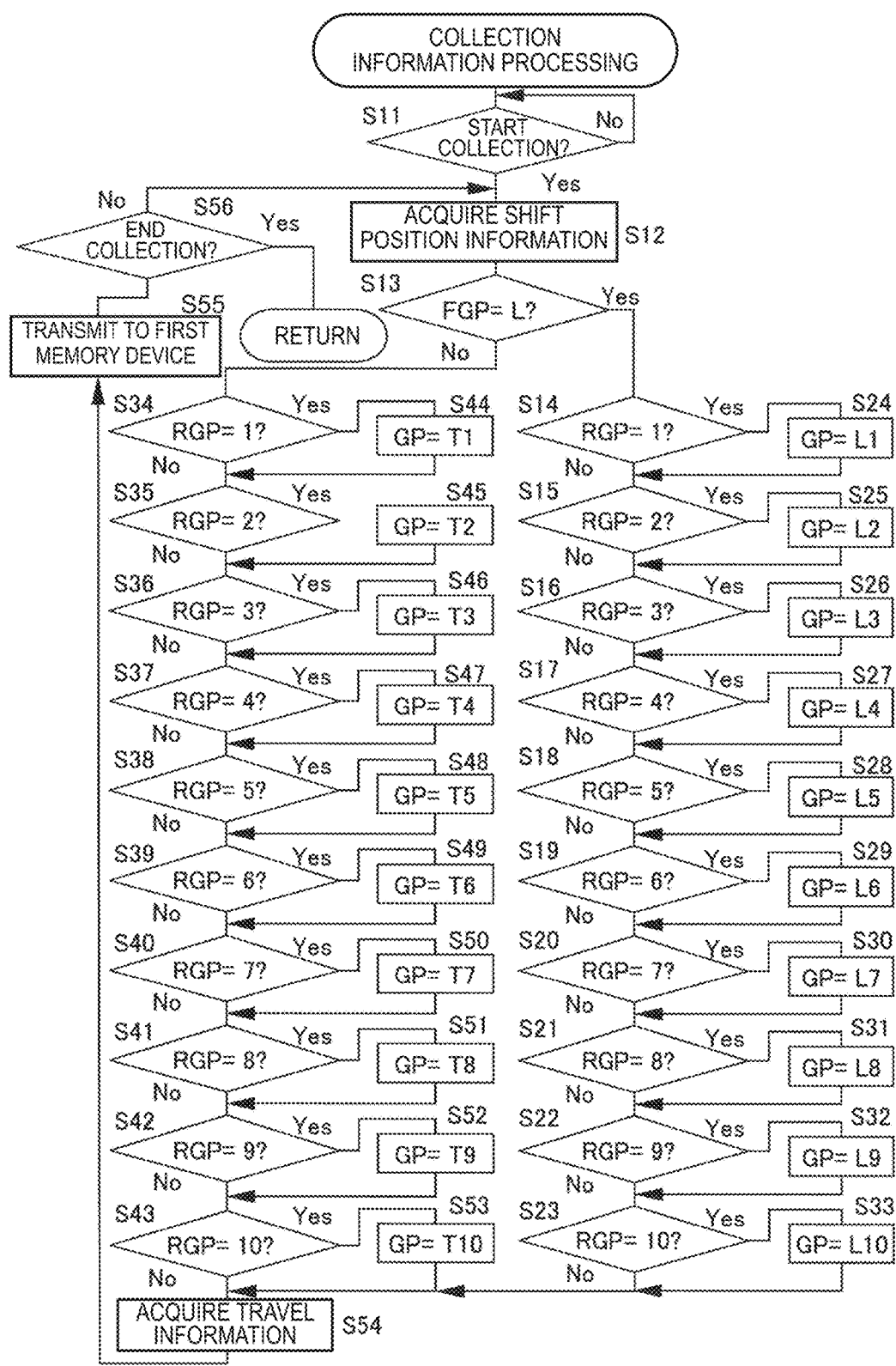
FIG. 5 is a table listing combinations of tooth numbers of a front sprocket and a rear sprocket and shift ratio by combination.

In FIG. 5, in the information collection processing, the first controller 20 controls so that the travel information and shift position information selected by the user is stored in a time series in the first memory device 26. In step S11, the first controller 20 waits for the start of collection processing. The user operates the first operation unit 24 when collecting the shift position information and the travel information. When the first controller 20 determines that the user operated to start collection of information using the first operation unit 24, the process proceeds from step S11 to step S12. In step S12, the first controller 20 takes in the information of the respective shift positions acquired by the front shift position sensor 30f and the rear shift position sensor 30r. In step S13, the first controller 20 determines whether the taken-in front shift position FGP is or is not L. When it is determined that the acquired front shift position FGP is L, the process proceeds from step S13 to step S14.

In step S14 to step S23, it is determined as to whether the rear shift position RGP is any of the first position to the tenth position. When the rear shift position RGP is the first position, the process proceeds from step S14 to step S24, and the first controller 20 sets the shift position information GP to L1. When the rear shift position RGP is the second position, the process proceeds from step S15 to step S25, and the first controller 20 sets the shift position information GP to L2. When the rear shift position RGP is the third position, the process proceeds from step S16 to step S26, and the first controller 20 sets the shift position information GP to L3. When the rear shift position RGP is the fourth position, the process proceeds from step S17 to step S27, and the first controller 20 sets the shift position information GP to L4. When the rear shift position RGP is the fifth position, the process proceeds from step S18 to step S28, and the first controller 20 sets the shift position information GP to L5. When the rear shift position RGP is the sixth position, the process proceeds from step S19 to step S29, and the first controller 20 sets the shift position information GP to L6. When the rear shift position RGP is the seventh position, the process proceeds from step S20 to step S30, and the first controller 20 sets the shift position information GP to L7. When the rear shift position RGP is the eighth position, the process proceeds from step S21 to step S31, and the first controller 20 sets the shift position information GP to L8. When the rear shift position RGP is the ninth position, the process proceeds from step S22 to step S32, and the first controller 20 sets the shift position information GP to L9. When the rear shift position RGP is the tenth position, the process proceeds from step S23 to step S33, and the first controller 20 sets the shift position information GP to L10.

When it is determined that the front shift position information FGP is the second position, the process proceeds from step S13 to step S34. In step S34 to step S43, it is determined as to whether the rear shift position RGP is in any of the first position to the tenth position just as from step S14 to step S23. When the rear shift position RGP is the first position, the process proceeds from step S34 to step S44, and the first controller 20 sets the shift position information GP to T1. When the rear shift position RGP is the second position, the process proceeds from step S35 to step S45, and the first controller 20 sets the shift position information GP to T2. When the rear shift position RGP is the third position, the process proceeds from step S36 to step S46, and the first controller 20 sets the shift position information GP to T3. When the rear shift position RGP is the fourth position, the process proceeds from step S37 to step S47, and the first controller 20 sets the shift position information GP to T4. When the rear shift position RGP is the fifth position, the process proceeds from step S38 to step S48, and the first controller 20 sets the shift position information GP to T5. When the rear shift position RGP is the sixth position, the process proceeds from step S39 to step S49, and the first controller 20 sets the shift position information GP to T6. When the rear shift position RGP is the seventh position, the process proceeds from step S40 to step S50, and the first controller 20 sets the shift position information GP to T7. When the rear shift position RGP is the eighth position, the process proceeds from step S41 to step S51, and the first controller 20 sets the shift position information GP to T8. When the rear shift position RGP is the ninth position, the process proceeds from step S42 to step S52, and the first controller 20 sets the shift position information GP to T9. When the rear shift position RGP is the first position, the process proceeds from step S43 to step S53, and the first controller 20 sets the shift position information GP to T10.

When step S23, step S33, step S43, or step S53 ends, the process proceeds to step S54. In step S54, the first controller 20 takes in travel information acquired at that time by the travel position information acquisition unit 32. For example, in the present embodiment, the vehicle speed acquired by the velocity sensor 32*a* and the cadence acquired by the cadence sensor 32*b* are taken in at the time acquired. In step S55, the first controller 20 transmits the set shift position information GP and the taken-in travel information to the first memory device 26 and writes the same to the first memory device 26. In step S56, it is determined as to whether the user has performed an operation to end collection using the first operation unit 24. When it is determined that an operation to end collection was performed, the information collection processing ends. When it is determined that an operation to end collection has not been performed, the process returns to step S12, and shift position information and travel information are acquired in the next timing.

Figure 6:
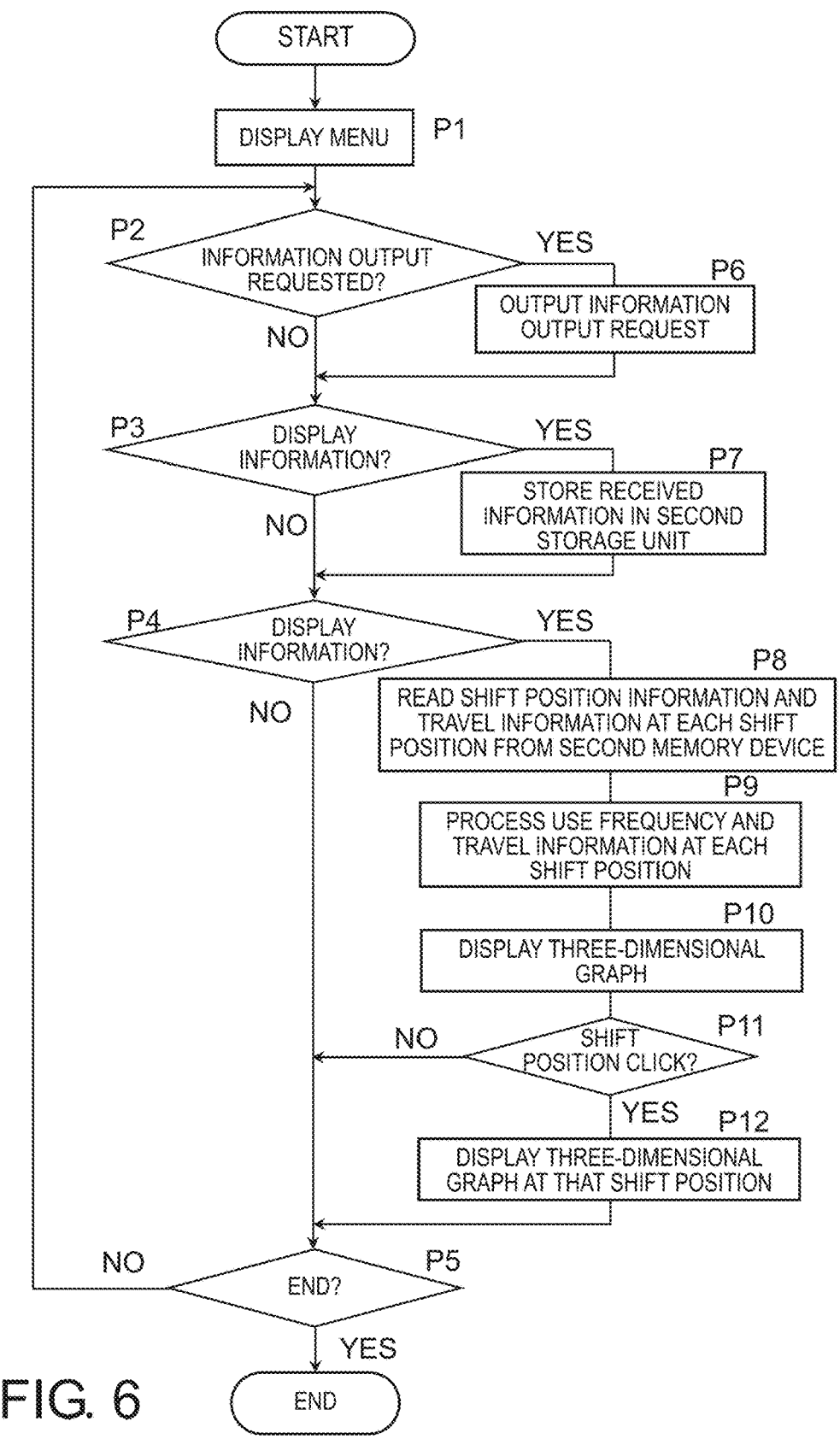
FIG. 6 is a flowchart illustrating one example of control operation executed by the second controller.

The control operation of the information processing device 14 is next described based on the flowchart illustrated in FIG. 6. This operation is realized by a computer, App, or other software as previously stated.

In step P1 in FIG. 6, the second controller 34 displays a menu for information processing on the second display unit 36. For example, the second controller 34 displays three menu buttons for requesting to output information, displaying information, and ending operation on the second display unit 36. In step P2, it is determined as to whether an operation requesting to output information was or was not performed, for example, by the user aligning the cursor on the menu button for requesting to output information using a mouse and clicking thereon, or by pressing the menu button on a touch panel, or by another operation. In step P3, the second controller 34 determines whether reception of information from the information collection system 12 was or was not completed. In step SP4, the second controller 34 determines whether the user has or has not performed an operation to display information, for example, by the user aligning the cursor on the menu button for displaying information using a mouse and clicking thereon, or by pressing the menu button on a touch panel, or by another operation. In step P5, the second controller 34 determines whether the user has or has not performed an operation to end by the user aligning the cursor on the menu button for ending and clicking thereon, or pressing the menu button on a touch panel, or by another operation. When it is determined that an operation to end was performed, the second controller 34 ends processing.

When the second controller 34 determines that the user has performed an operation requesting to output information, the process proceeds from step P2 to step P7. In step P6, an information output request is output to the information collection system 12. When the information collection system 12 receives this request, the first controller 20 determines that fact in step S3 in FIG. 4, and the acquired shift position and travel information is output to the information processing device 14 in step S5.

Figure 7:
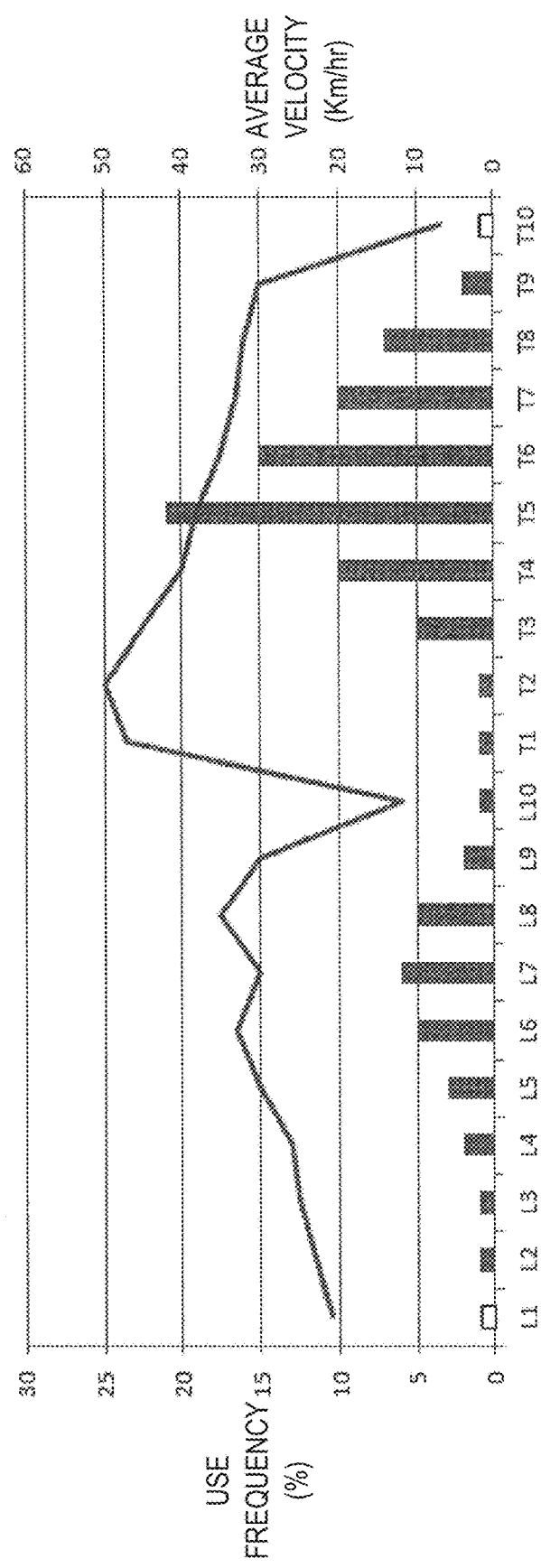
FIG. 7 is a graph illustrating collected use frequencies of transmission apparatuses and average velocity for each transmission apparatus.
Figure 8:
FIG. 8 is a graph illustrating separately collected use frequencies of transmission apparatuses and average velocity for each transmission apparatus.

When reception of information from the information collection system 12 is completed, the process proceeds from step P3 in FIG. 6 to step P7. In step P7, the second controller 34 stores the received information in the second memory device 40. When the second controller 34 determines that the user performed an operation to display information, the process proceeds from step P4 to step P8. In step P8, the second controller 34 reads the shift position information and the travel information of each shift position from the second memory device 40. For example, the cadence and traveling velocity at each shift position is read as travel information. In step P9, the use frequency of each item of shift position information read is calculated, and processing of travel information (in the present embodiment, the average value of traveling velocities at each shift position) is executed. In step P10, the use frequency of each shift position and/or the processed travel information (in the present embodiment, average velocity) is/are displayed on a two-dimensional graph as illustrated in FIGS. 7 and 8. In step P11, it is determined as to whether a shift position displayed on the two-dimensional graph was or was not clicked on. The user performs this operation when the user wants to know detailed travel information at a certain shift position. In step P12, the second controller 34 controls display of use frequency for each shift position calculated (see FIG. 7) and three-dimensional display of travel information (see FIG. 9), and the process proceeds to step P5. The process proceeds to step P5 when a shift position is not selected in step P11.

In FIG. 7, the use frequency of each shift position is displayed, for example, on a bar graph. The processed travel information (in the present embodiment, average velocity at each shift position) is displayed, for example, on a line graph. In FIG. 7, it is understood that shifting with the chain running diagonally to the extreme in L1 and T10, which is normally inaccessible, has been performed. Those areas are displayed whitened out, differing from the rest of the display. The user can thereby quickly recognize that inaccessible shift positions were selected. It is also understood that shift position T5 spikes and has been use most.

Meanwhile, in FIG. 8, it is understood that shift positions not normally used much have been used much by the user. It is thereby understood that tooth numbers of each sprocket of the front derailleur and the rear derailleur are not suitable for the user. In such case, the front sprockets and rear sprockets must be replaced with those having different tooth numbers.

Figure 9:
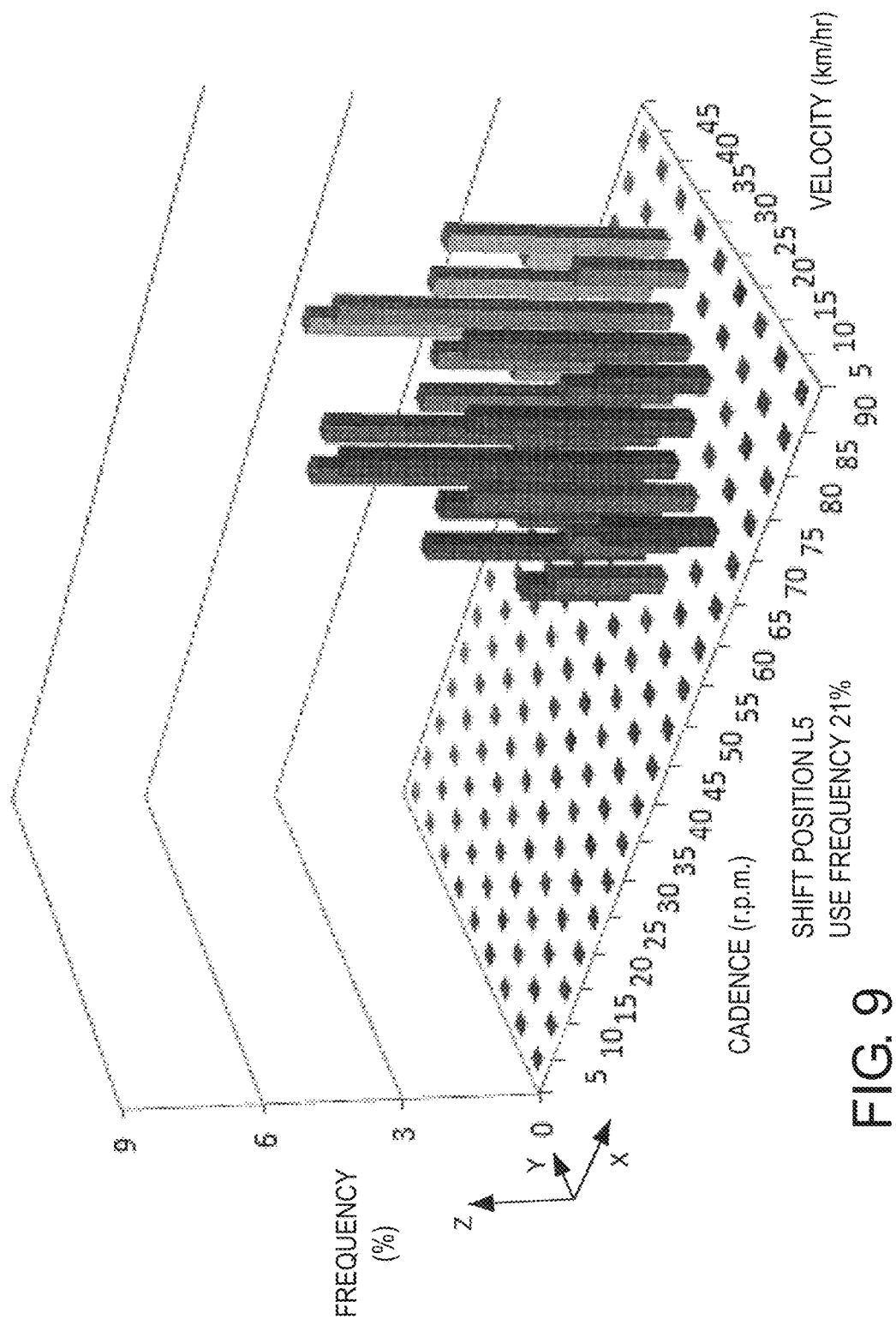
FIG. 9 is a graph three-dimensionally illustrating occurrence frequencies of travel information in a certain transmission apparatus.
Figure 11:
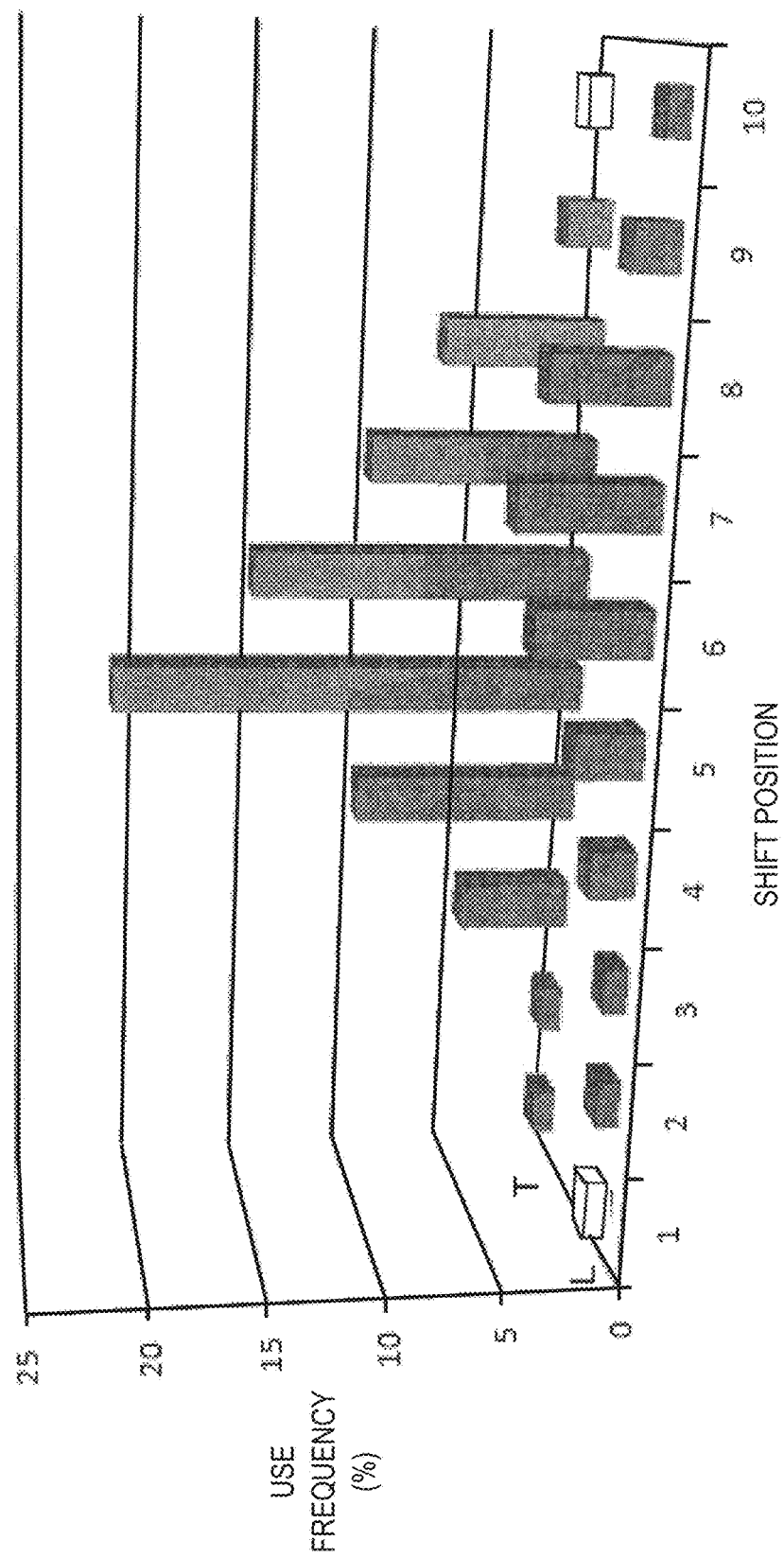
FIG. 11 is a chart illustrating use frequency of each transmission apparatus in a bar graph of another style.
Figure 12:
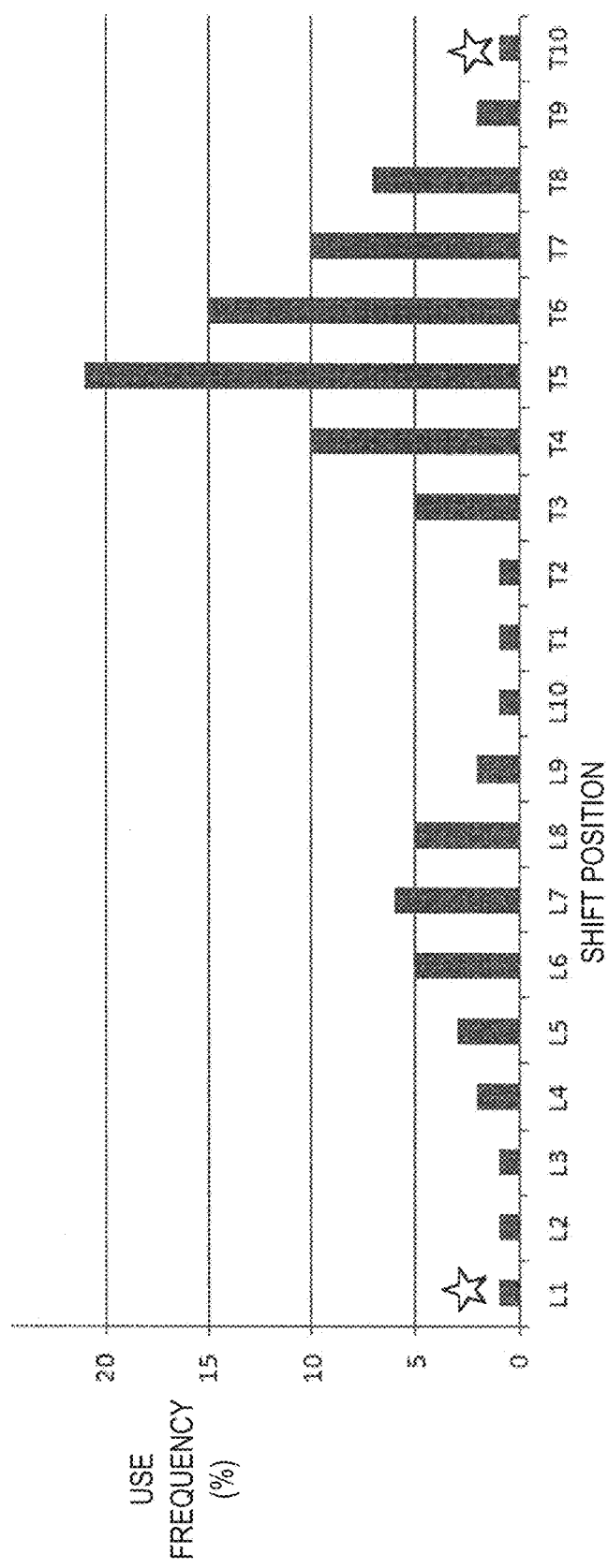
FIG. 12 is a chart illustrating use frequency of each transmission apparatus in a bar graph of yet another style.
Figure 13:
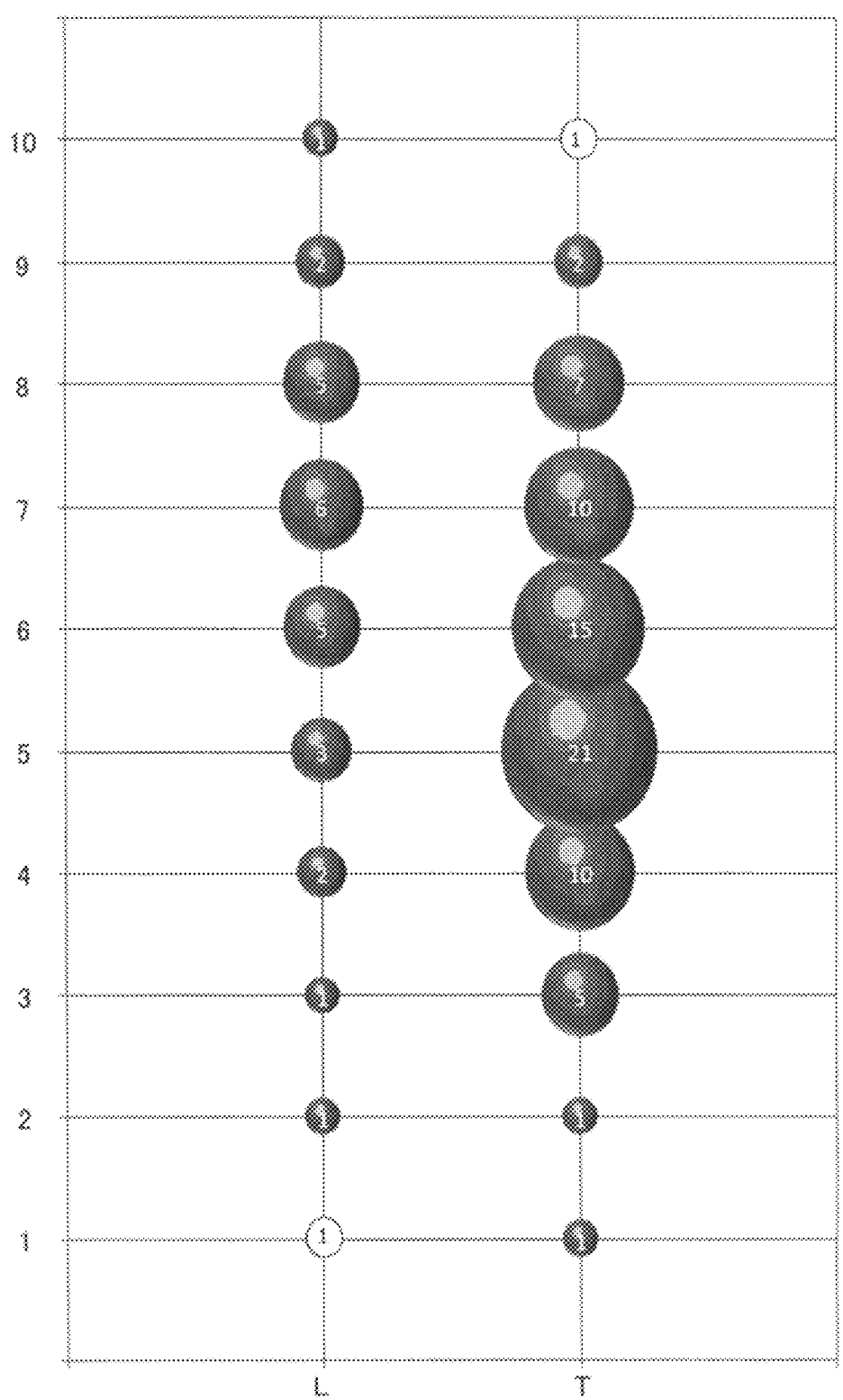
FIG. 13 is a chart illustrating use frequency of each transmission apparatus in a balloon chart of yet another style.

When the cursor is aligned and clicked on the area "L5" or that area is pressed on the screen illustrated in FIG. 7 or FIG. 8, the travel information (in the present embodiment, traveling velocity and cadence) at shift position L5 with the front shift position at L and the rear shift position at 5 is displayed three-dimensionally as illustrated in FIG. 9. In FIG. 9, the frequencies of the two items of travel information (in the present embodiment, traveling velocity and cadence) are displayed on the Z axis, and the magnitude of the traveling velocity and the magnitude of the cadence are taken in levels on the Y and X axes, respectively. By looking at FIGS. 7 and 8, the user can know what kinds of shift positions were used in accordance with a use history of the shift positions in a certain period. Also by looking at FIG. 9, the user can know how the travel information changed in each shift position. An optimal travel pattern can thereby be obtained in bicycle training. The display of use frequency is not limited to the graphs in FIGS. 7 and 8, and may also be displayed being divided into two two-dimensional bar graphs as illustrated in FIG. 11. The use frequency at each shift position may also be displayed alone without displaying the traveling velocity, as illustrated in FIG. 12. The display may also be in a pie graph, line graph, or balloon chart illustrated in FIG. 13, or a graph of another style. In FIG. 12, stars are assigned to areas where inaccessible combinations of shift positions are used. In FIG. 13, inaccessible combinations of shift positions are displayed being whitened out.

Here, the shift position information transmitted to the first memory device 26 is analyzed (for example, use frequencies of a plurality of shift positions are calculated), whereby the user can know what kinds of shift positions were used.

The use frequency of each shift position also is calculated, and therefore a shifting trend of the user can be known.

The information collection system 12 further has an information output unit (first communication unit 28) for outputting to an external device, and therefore the shift position information and the associated travel information can be finely analyzed in the external device.

Other Embodiments

One embodiment of the present invention was described above, but the present invention is not limited to the above embodiments, and various modifications are possible within a scope not deviating from the main point of the present invention. Specifically, a plurality of embodiments and modified examples written about in the present specification can be optionally combined as needed.

(a) In the above embodiment, the information collection system 12 only collected shift position information and travel information, but the present invention is not limited to this. The use frequency of the shift position information may be displayed in an information collection system 12 mounted on the bicycle.

Figure 10:
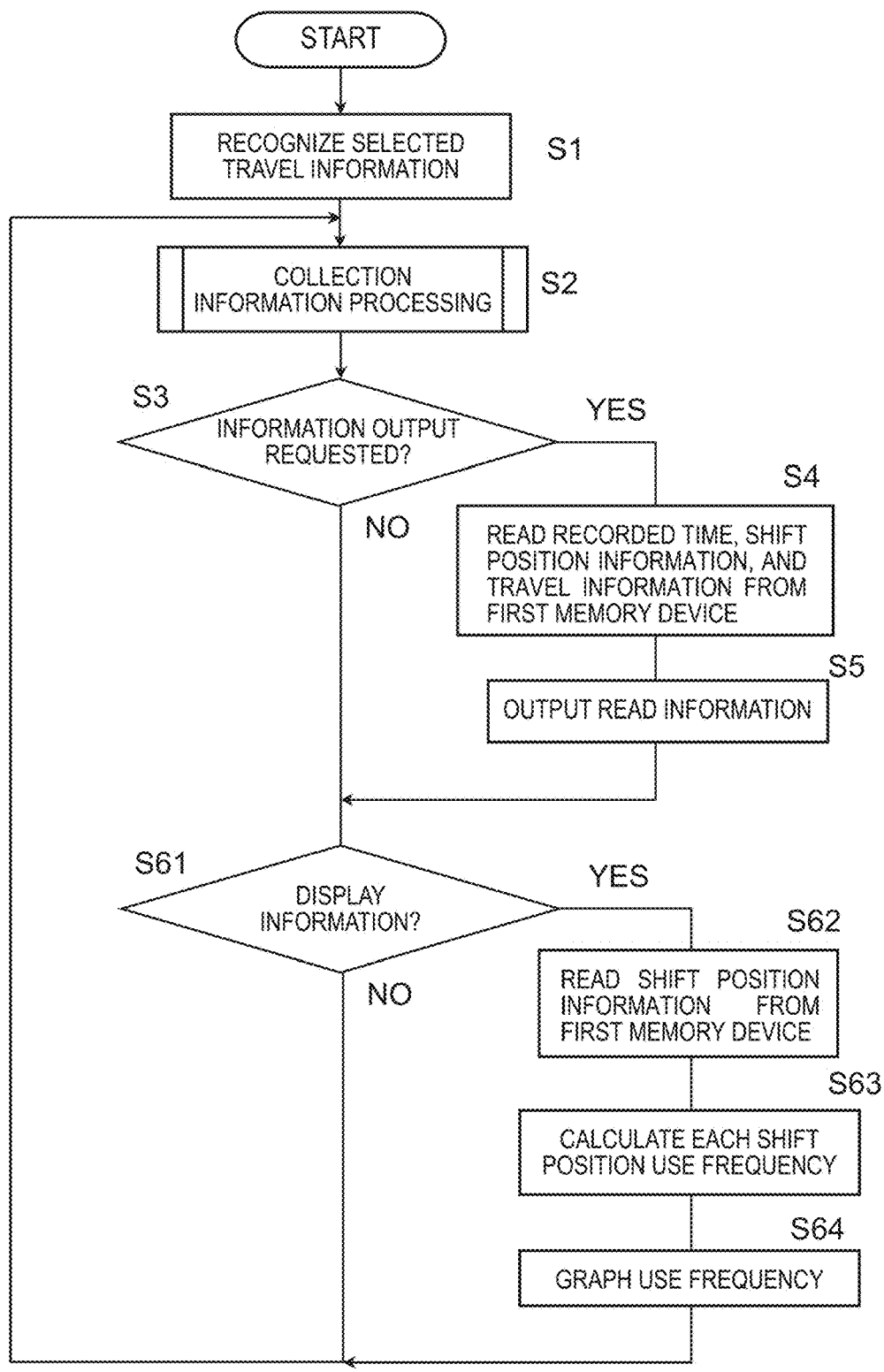
FIG. 10 is a flowchart illustrating one example of control operation of information processing executed by the first controller of another embodiment.

In FIG. 10, the first controller 20 of the information collection system 12 performs the same processing in steps S1 to step S5 as the processing in the above embodiment illustrated in FIG. 4. When there is no request to output information in step S3, the process proceeds to step S61, and it is determined as to whether an operation to display information was or was not input. The operation to display information is input by the user operating the first operating unit 24. When it is determined that an operation to display information was input, the process proceeds from step S61 to step S62. In step S62, the first controller 20 reads the shift position information from the first memory device 26. In step S63, the first controller 20 calculates the use frequency of each shift position. In step S64, the use frequency of each shift position is displayed on the first display unit 22, for example, in the format of a bar graph, as illustrated in FIG. 7. The display of the use frequency, just as in the above embodiment, is not limited to the graphs in FIGS. 7 and 8, and the display may be on a two-dimensional bar graph illustrated in FIG. 7, a graph only of use frequency of each shift position illustrated in FIG. 12, a pie graph or line graph, a balloon chart illustrated in FIG. 13, or a graph of another style. When it is determined that an operation to display information was not input in step S61, and when processing ends in step S64, the process returns to step S2.

The use frequencies of the shift positions are thus displayed on the first display unit 22 of the information collection system 12 installed on the bicycle, whereby the user can confirm the use frequencies of the shift positions without connecting to an information processing device and the user can quickly know what kinds of shift positions were used. In this case, the information collection system 12 is one example of the information display device. The first controller 20 also is one example of the third controller, and the first display unit is one example of the third display unit.

(b) In the above embodiment, the velocity sensor 32a, cadence sensor 32b, inclination sensor 32c, torque sensor 32d, and heart rate sensor 32e were enumerated as examples of the travel information acquisition unit 32, but the present invention is not limited to this. For example, a temperature sensor, humidity sensor, altitude sensor, acceleration sensor, GPS information, and wind speed sensor may be included as travel information acquisition units.

(c) In the above embodiment, the velocity as travel information was acquired by output from a velocity sensor, but the present invention is not limited to this. For example, the velocity may be acquired by an arithmetic operation from the cadence, shift position, and cycle length of the wheel. The cadence also may be acquired from the velocity, shift position, and cycle length. The shift position furthermore may be acquired from the cadence, velocity, and cycle length.

(d) In the above embodiment, the period for acquisition of information by the first controller 20 was a period from an operation to start collection to an operation to end collection, but the present invention is not limited to this. For example, the shift position information and the travel information may be acquired in a period from a start of travel to an end of travel, or in a prescribed interval (time or distance), or in another period.

(e) In the above embodiment, shift position information and travel information in association with the shift position information were acquired, but the present invention is not limited to this. Shift position information alone also may be acquired.

(f) In the above embodiment, the use frequency of each shift position and the travel information were displayed, but the present invention is not limited to this. For example, a change of shift position in a time series may be displayed. In this case, bicycle inclination, user pulse, and the like, may be aligned to a shift position as travel information and be displayed in a time series.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. An information collection system configured to collect information related to a bicycle, the information collection system comprising:
   a shift position information acquisition unit configured to acquire historical shift positions over a prescribed period of time related to a bicycle transmission apparatus having a plurality of shift positions; and
   a first controller programmed to transmit the historical shift positions acquired during the prescribed period of time.

2. The information collection system according to claim 1, further comprising
   a memory device in communication with the first controller, the first controller storing the historical shift positions in the first memory device.

3. The information collection system according to claim 2, wherein
   the first controller is programmed to calculate a use frequency of each shift position of the bicycle transmission apparatus based on the historical shift positions stored in the memory device.

4. The information collection system according to claim 3, further comprising
   a first display unit in communication with the first controller, the first controller being programmed to control the first display unit to display the use frequency.

5. The information collection system according to claim 2, further comprising
   an information output unit configured to externally output information stored in the memory device with respect to the information collection system.

6. The information collection system according to claim 5, wherein
   the information output unit is configured to externally output the historical shift positions in a wired or wireless manner.

7. The information collection system according to claim 1, wherein
   the historical shift positions include a shift position of one of an external transmission and an internal transmission.

8. The information collection system according to claim 7, wherein
   the historical shift positions include a shift position one of a front derailleur and a rear derailleur.

9. The information collection system according to claim 8, wherein
   the historical shift positions include information related to a combination of the shift position of the front derailleur and the shift position of the rear derailleur.

10. The information collection system according to claim 1, further comprising
    a travel information acquisition unit configured to acquire travel information of the bicycle; and
    the first controller being programmed to transmit the acquired travel information in association with the historical shift positions.

11. The information collection system according to claim 10, wherein
    the travel information includes at least one of wheel rotation speed, velocity, cadence, inclination, ambient temperature, ambient humidity, altitude, acceleration, foot power and user heart rate.

12. An information processing system comprising:
    an information collection device configured to collect information related to a bicycle; and
    an information processing device configured to communicate with the information collection device, wherein
    the information collection device comprises a shift position information acquisition unit configured to acquire historical shift positions detected by at least one sensor over a prescribed period of time related to a transmission apparatus having a plurality of shift positions, and an information output unit configured to externally output the historical shift positions acquired by the shift position information acquisition unit with respect to the information processing system; and
    the information processing device comprising a second controller programmed to calculate a use frequency of each shift position of the transmission apparatus based on the historical shift positions output from the information output unit.

13. The information processing system according to claim 12, wherein
    the information processing device further comprises a second display unit, and
    the second controller is programmed to control the second display unit to display the use frequency.

14. The information processing system according to claim 13, wherein
    the information collection device further comprises a travel information acquisition unit configured to acquire travel information of the bicycle,
    the information output unit is configured to output the travel information associated with the historical shift positions, and
    the second controller is programmed to control the second display unit to display at least one of the use frequency and the travel information.

15. The information processing system according to claim 14, wherein
    the second controller is programmed to control the second display unit to display three-dimensionally at least one of the use frequency and the travel information.

16. An information display device comprising:
    a third display unit; and
    a third controller programmed to calculate a use frequency of each shift position of a bicycle transmission apparatus having a plurality of shift positions, based on historical shift positions detected by at least one sensor over a prescribed period of time related to the bicycle transmission apparatus acquired during the prescribed period by a shift position information acquisition unit for acquiring the historical shift positions, and programmed to control the third display unit to display the use frequency.

17. A non-transitory, tangible computer-readable medium encoded with a computer program programmed to use stored data of an information collection system that collects information related to a bicycle, the computer program executing:
   an instruction to acquire historical shift positions detected by at least one sensor over a prescribed period of time related to a bicycle transmission apparatus having a plurality of shift positions; and
   an instruction to transmit the historical shift positions acquired during the prescribed period of time.

* * * * *